(12) United States Patent
Jung

(10) Patent No.: US 9,029,722 B2
(45) Date of Patent: May 12, 2015

(54) KEY ASSEMBLY AND MOBILE TERMINAL HAVING THE SAME

(71) Applicant: LG Electronics Inc., Seoul (KR)

(72) Inventor: Jaejun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 13/659,636

(22) Filed: Oct. 24, 2012

(65) Prior Publication Data

US 2013/0114199 A1 May 9, 2013

(30) Foreign Application Priority Data

Nov. 3, 2011 (KR) .................. 10-2011-0114141

(51) Int. Cl.
*H01H 13/702* (2006.01)
*H04M 1/23* (2006.01)
*H04M 1/02* (2006.01)

(52) U.S. Cl.
CPC ............ *H04M 1/236* (2013.01); *H01H 13/702* (2013.01); *H04M 1/0237* (2013.01); *H01H 2203/038* (2013.01); *H01H 2205/016* (2013.01); *H01H 2231/022* (2013.01)

(58) Field of Classification Search
CPC .............. H01H 13/70; H01H 13/702–13/705; H01H 13/785
USPC ............... 200/206, 341–345, 511–517, 5 A; 345/160–170; 400/490–496
See application file for complete search history.

(56) References Cited

U.S. PATENT DOCUMENTS

| | | | |
|---|---|---|---|
| 6,982,394 B2 * | 1/2006 | Ide et al. ................. | 200/516 |
| 7,737,373 B2 * | 6/2010 | In et al. ................... | 200/1 B |
| 2005/0181843 A1 | 8/2005 | Tsujimoto | |
| 2007/0184877 A1 | 8/2007 | In et al. | |
| 2009/0000936 A1 | 1/2009 | Steijner | |

FOREIGN PATENT DOCUMENTS

| | | |
|---|---|---|
| CN | 1658624 A | 8/2005 |
| CN | 101018378 A | 8/2007 |
| EP | 1566951 A1 | 8/2005 |
| EP | 1816662 A2 | 8/2007 |

* cited by examiner

*Primary Examiner* — Amy Cohen Johnson
*Assistant Examiner* — Marina Fishman
(74) *Attorney, Agent, or Firm* — Birch, Stewart, Kolasch & Birch, LLP

(57) ABSTRACT

A mobile terminal includes a terminal body, and a manipulating portion disposed on one side surface of the terminal body, wherein the manipulating portion includes: a substrate having a first contact point and a second contact point; and a conductive dome configured to conduct the first and second contact points when being pressed, wherein the first and second contact points are spaced from each other on the substrate in a first direction, and wherein the second contact point portion is not disposed in a second direction crossing the first direction. Under these configurations, the mobile terminal can have more various designs.

14 Claims, 6 Drawing Sheets

KEY ASSEMBLY AND MOBILE TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2011-0114141, filed on Nov. 3, 2011, the contents of which is incorporated by reference herein in its entirety.

BACKGROUND OF THE INVENTION

1. Field of the Invention

The present disclosure relates to a mobile terminal, and particularly, to a mobile terminal having an input device.

2. Description of Related Art

A mobile terminal is a device that can be carried around and has one or more functions such as to perform voice and video call communications, inputting and outputting information, storing data, and the like.

Recently, as functions of the mobile terminal become more diversified, the mobile terminal may be embodied in the form of a multimedia player or a device, having various functions such as memo-writing, receiving or sending an e-mail, and schedule management.

For information input and execution of such various functions, the mobile terminal is provided with an input device. The input device is implemented in various forms such as a dome switch, a touch pad, a touch screen and a jog wheel.

The input device implemented as a dome switch serves to input information by pressure, which may be applied to a keypad having a QWERTY type keyboard, a home key, a side key for volume control, etc.

In case of the dome switch applied to a side key, there may occur a problem in implementing the appearance of the mobile terminal according to the size of a substrate where contact patterns are formed. Therefore, a method for fabricating a substrate having a smaller size may be considered.

BRIEF SUMMARY OF THE INVENTION

Therefore, an aspect of the detailed description is to provide a key assembly having a structure where a substrate has a small area.

To achieve these and other advantages and in accordance with the purpose of this specification, as embodied and broadly described herein, there is provided a key assembly, comprising: a substrate having a first contact point and a second contact point spaced from each other; and a conductive dome configured to conduct the first and second contact points when being pressed, wherein the second contact point is spaced from one side surface of the first contact point, but is not disposed to enclose an outer circumference of the first contact point.

According to an embodiment of the present invention, the second contact point may be formed in plurality. And, the plurality of second contact points may be spaced from two side surfaces of the first contact point in a state where the first contact point is disposed therebetween.

According to an embodiment of the present invention, the conductive dome may be coupled to the substrate by a dome sheet.

According to an embodiment of the present invention, the substrate may be implemented as a flexible printed circuit board (FPCB).

According to an embodiment of the present invention, the conductive dome may include a transformation portion contacting the first contact point by being transformed by pressure, and a contact portion contacting at least one of the second contact points. The contact portion may be formed on two side surfaces of the transformation portion.

According to an embodiment of the present invention, the key assembly may further comprise a key body configured to press the transformation portion.

According to an embodiment of the present invention, the key assembly may further include a ring portion formed to enclose the first contact point. And, the ring portion may be divided into a first region where the second contact point is disposed, and a second region where the second contact point is not disposed.

According to an embodiment of the present invention, the second region may be a region outside the substrate.

According to an embodiment of the present invention, the conductive dome may be formed to have a first curvature and a second curvature. The first curvature may be formed close to one side end of the substrate, and at least part thereof may be disposed at the second region. And, the second curvature may be formed to contact the second contact point.

To achieve these and other advantages and in accordance with the purpose of this specification, as embodied and broadly described herein, there is also provided a mobile terminal, comprising: a terminal body; and a manipulating portion disposed on one side surface of the terminal body, wherein the manipulating portion includes: a substrate having a first contact point and a second contact point; and a conductive dome configured to conduct the first and second contact points when being pressed, wherein the second contact point is spaced from the first contact point on the substrate in a first direction, and wherein the second contact point portion is not disposed in a second direction crossing the first direction.

The present invention may have the following advantages.

Since the key assembly which constitutes a side key formed on the side surface of the mobile terminal has a smaller area, the mobile terminal can have more various designs.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present disclosure may be also applicable to a fixed terminal such as a digital TV and a desktop computer.

Figure 1:
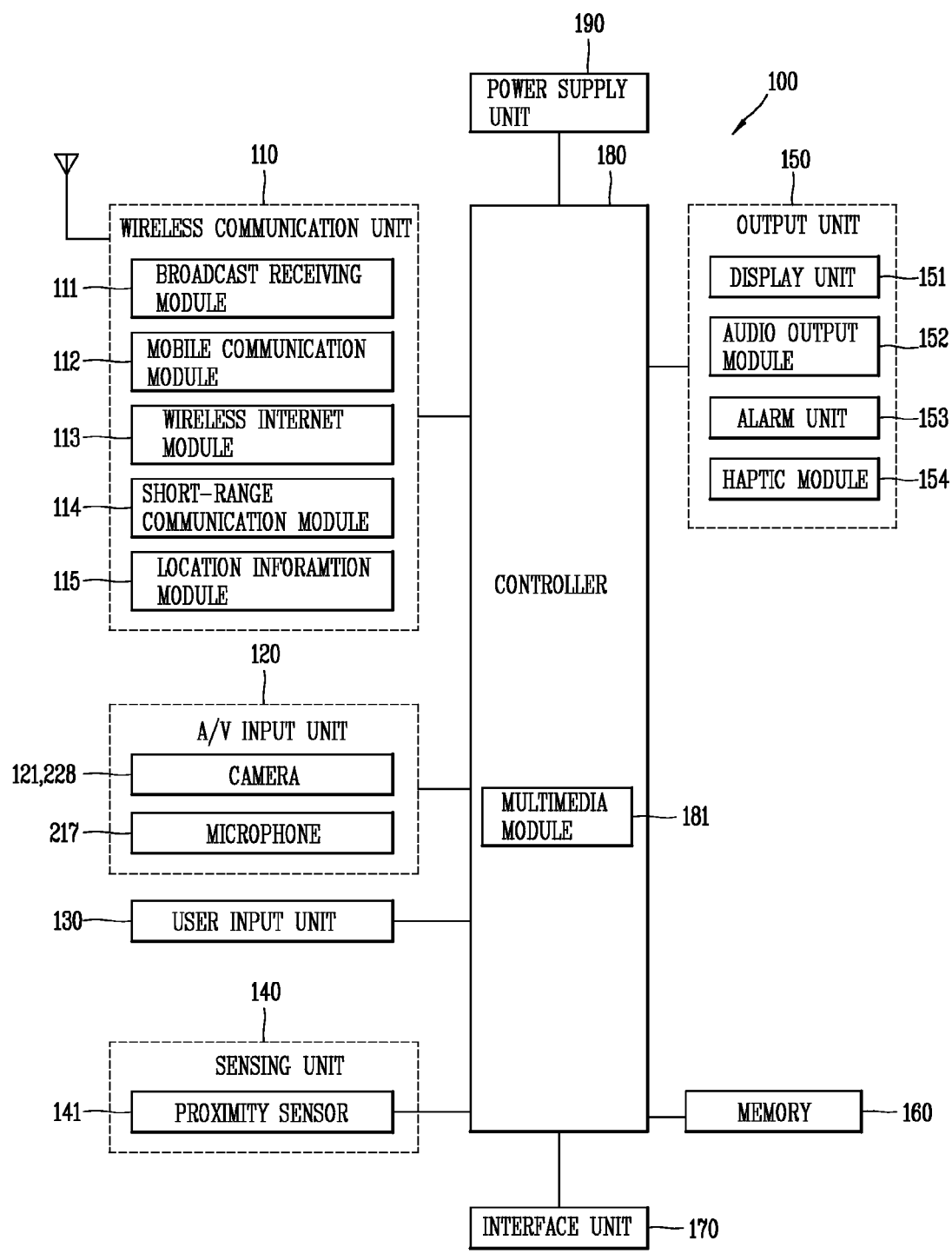
FIG. 1 is a block diagram of a mobile terminal according to embodiments of the present invention.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless interne module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include cameras 121 and 228, a microphone 217 or the like. The cameras 121 and 228 process image data of still pictures or video acquired by an image capture device in a video capturing mode or an image capturing mode. The processed image frames may be displayed on a display unit 151.

The image frames processed by the cameras 121 and 228 may be stored in the memory 160 or transmitted via the wireless communication unit 110. Two or more cameras 121 and 228 may be provided according to the configuration of the mobile communication terminal.

The microphone 217 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 217 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
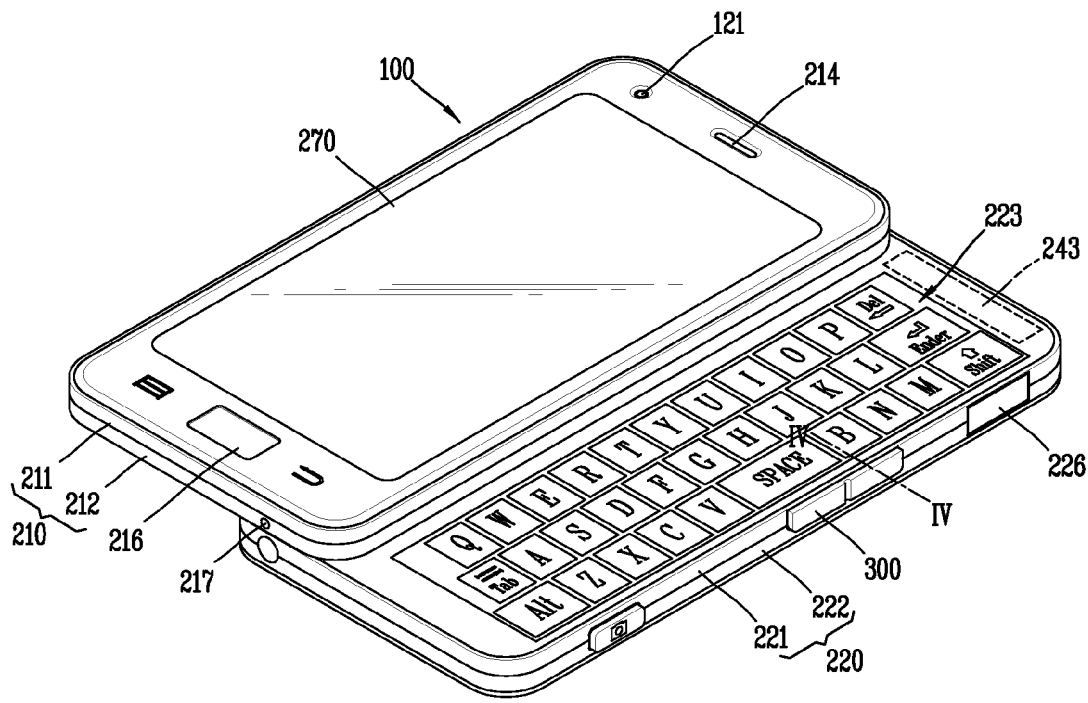
FIG. 2 is a front perspective view of a mobile terminal according to embodiments of the present invention.

FIG. 2 is a front perspective view of the mobile terminal according to one embodiment of the present invention.

Referring to FIG. 2, the mobile terminal 100 includes a second body 220, and a first body 210 coupled to the second body 220 so as to perform relative sliding motion along at least one direction.

A state that the first body 220 and the second body 210 are arranged to overlap each other may be called a 'closed configuration'. As shown in FIG. 2, a state that one or more parts of the first second body 210 are exposed by the second body 220 may be called an 'open configuration'.

The mobile terminal 100 operates in a standby mode in the closed configuration. However, the standby mode may be released according to a user's manipulations. The mobile terminal 100 operates in a call mode, etc. in the open configuration. However, the call mode may be converted into the standby mode according to a user's manipulation or a lapse of time.

A case which forms an outer appearance of the first body 210 may include a first front case 211 and a first rear case 212. Various types of electronic components are accommodated in space formed by the first front case 211 and the first rear case 212. At least one intermediate case may further be disposed between the first front case 211 and the first rear case 212. Such cases may be formed by injection-molded synthetic resin, or may be formed using a metallic material such as stainless steel (STS) or titanium (Ti).

At the first front case 211 of the second body 210, may be disposed the display unit 151, a first audio output unit 214, and the first user input unit 216.

The display unit 151 includes a liquid crystal display (LCD), an organic light emitting diodes (OLED) each for displaying information in a visual manner, or the like. The display unit 151 may be provided with a touch pad overlapping therewith in a layered structure. Under this configuration, the display unit 151 may operate as a touch screen, thereby allowing a user's input in a touch manner.

The first audio output module 214 may be implemented as a receiver or a speaker. The first user input unit 216 may be provided with input keys such as a joystick key, a touch pad, a track ball, a pointing stick and a finger mouse.

A case which forms an outer appearance of the second body 220 may include a second front case 221 and a second rear case 222. A second user input unit 223 may be disposed on the front surface of the second front case 221 of the second body 220.

A third user input unit 300 and the microphone 217 may be disposed on at least one of the second front case and the second rear case.

The second user input unit 223 is configured to input commands for controlling the operation of the mobile terminal, i.e., commands such as START, END and SCROLL, numbers, texts, symbols or the like. The second user input unit 223 may be implemented as a QWERTY type keyboard. The QWERTY type keyboard may include key buttons arranged in a QWERTY manner, and key information (e.g., texts, numbers, symbols, etc.) for key input is displayed on the key buttons. The key buttons may be disposed on a dome switch.

The second user input unit 223 may include any type of ones that can be manipulated in a user's tactile manner. For instance, the user input units 130, 223 and 300 may be implemented as a dome switch or a touch pad for receiving a command or information by a user's push or touch operation. Alternatively, the user input units may be implemented as a wheel for rotating a key, or a jog wheel or a jog switch.

The third user input unit 300 may operate as hot keys for activating a specific function of the mobile terminal.

The microphone 217 may be implemented in an appropriate form to input a user's voice, other sounds, etc.

A sliding sensor 243 may be provided on at least one of the first body 210 and the second body 220. When the first body 210 and the second body 220 performs sliding within a predetermined range, the sliding sensor 243 senses such sliding thus to output a sensing signal.

Figure 3:
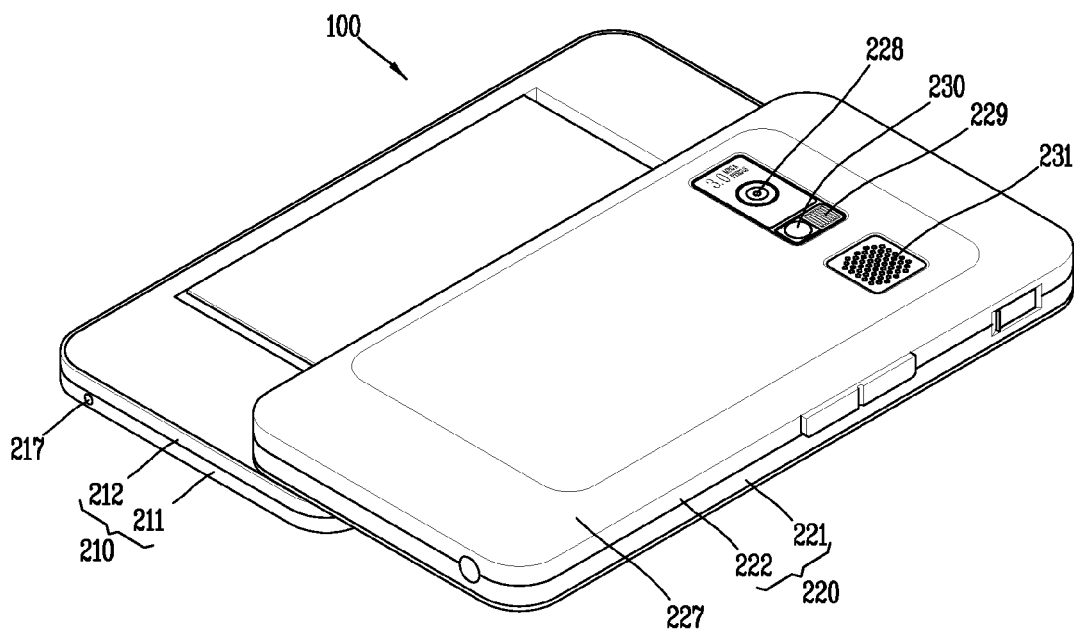
FIG. 3 is a rear perspective view of the mobile terminal of FIG. 2.

FIG. 3 is a rear perspective view of the mobile terminal of FIG. 2.

Referring to FIG. 3, the second image input unit 228, a fourth user input unit and the power supply unit 190 may be mounted on the rear surface of the second rear case of the second body 220.

The second image input unit 228 has a capturing direction in an opposite manner to the first image input unit 121, and may have pixels different from those of the first image input unit 121.

For example, the first image input unit 121 may operate with relatively lower pixels (lower resolution). Thus, the first image input unit 121 may be useful when a user can capture his face and send it to a calling party in a video call mode or the like. On the other hand, the second image input unit 228 may operate with a relatively higher pixels (higher resolution) such that it can be useful for a user to obtain higher quality pictures for later use. A flash 229 may be additionally disposed close to the second image input unit 228. When capturing an object by using the second image input unit 228, the flash 229 provides light to the object.

The fourth user input unit may be implemented as a wheel, and may operate as a key for a specific function (e.g. scroll) of the mobile terminal.

The interface 170 may serve as a passage through which the mobile terminal 100 of the present disclosure exchanges data with an external device. For instance, the interface 170 may be implemented as at least one of a wired/wireless connection port for connecting an earphone to the mobile terminal, a short-range communications port, power supply ports for providing power to the portable terminal, or the like. The interface 170 may be configured using a card socket (e.g., for coupling to a memory card, a subscriber identity module (SIM) card, a user identity module (UIM) card, etc.).

The power supply unit 190 may be a rechargeable battery, for example, to be detachably mounted to the second body 220 for charging.

Part of a slide module which slidably couples the first body 210 and the second body 220 to each other is disposed at the first rear case of the first body 210. Another part of the slide module may be disposed at the second front case of the second body 220, thus not to be exposed to the outside.

As shown in FIG. 3, the sliding sensor 243 is arranged on one of the first body 210 and the second body 220.

Alternatively, the sliding sensor 243 may be arranged at a hinge which connects the first body 210 and the second body 220 with each other.

Figure 4:
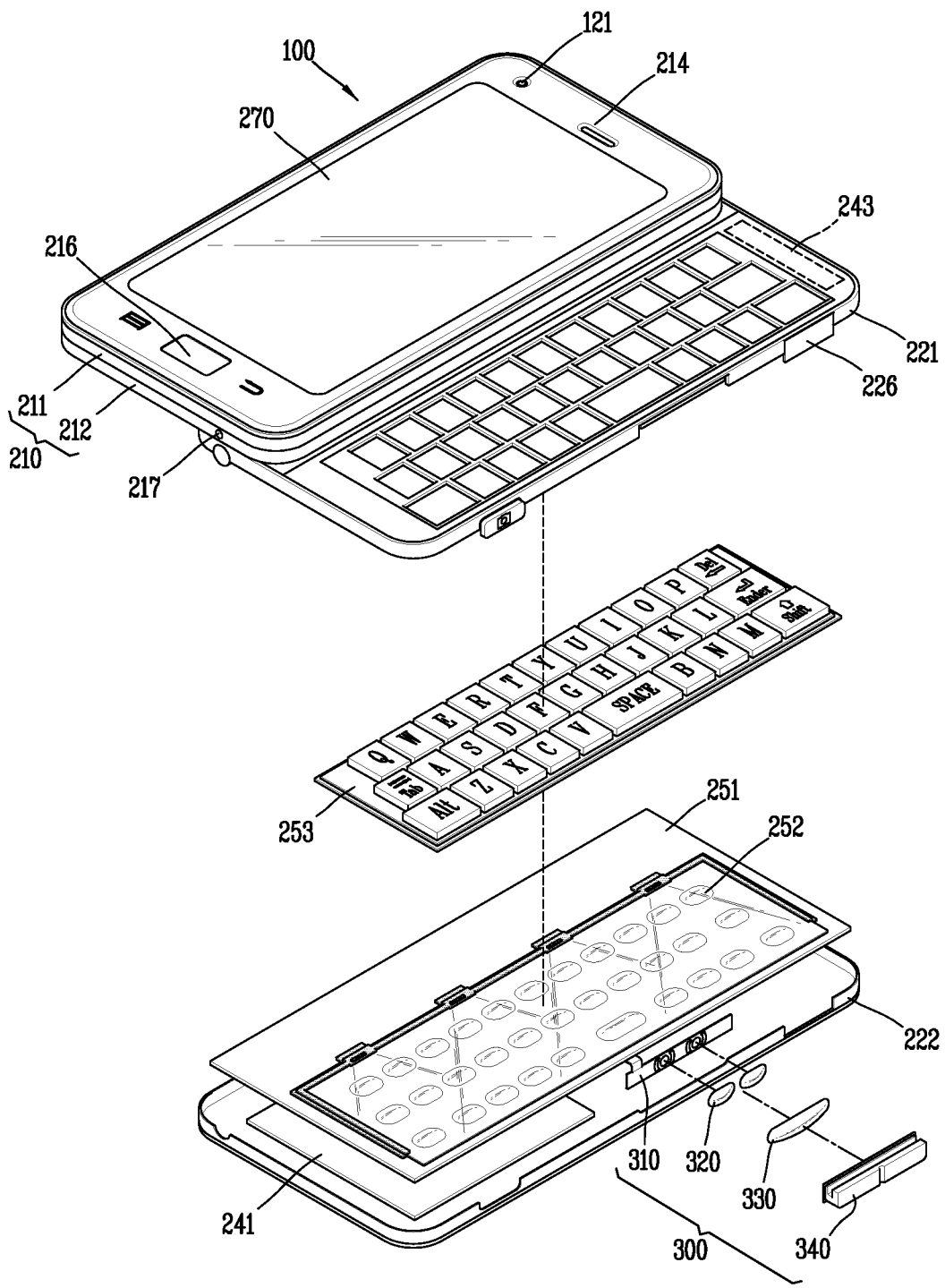
FIG. 4 is a disassembled perspective view of a second body of FIG. 2.

FIG. 4 is a disassembled perspective view of the second body 220 of FIG. 2.

As shown in FIG. 4, the second body 220 may have the appearance as the second front case 221 and the second rear case 222 are assembled to each other.

The second body 220 may be provided with a second user input unit 223 and a manipulating portion 300.

A first circuit board 241 and a second circuit board 251 may be disposed in the second front case 221 and the second rear case 222, respectively.

On the first circuit board 241, mounted are each type of components such as a processor associated with processing of a wireless signal of the mobile terminal. And, contact patterns for receiving a key input are formed on the second circuit board 252. In FIG. 4, the first circuit board 241 and the second circuit board 251 are separated from each other. However, the present invention is not limited to this. That is, the first circuit board 241 and the second circuit board 251 may be integrally formed with each other. Alternatively, the first circuit board 241 and the second circuit board 251 may have a structure of more than two layers.

In order to reduce the thickness of the mobile terminal, and in order to simplify the fabrication and assembly processes, the second circuit board 251 may be implemented as a flexible printed circuit board.

In this case, the second circuit board 251 may include a key pad substrate having keys 253 coupled thereto and constituting the second user input unit 223 disposed on the upper surface of the second body 220, and a substrate 310 extending from the key pad substrate and constituting a manipulating portion 300 disposed on the side surface of the second body 220.

Even if the second user input unit 223 and the manipulating portion 300 are disposed on different positions of the mobile terminal, they can be connected to the single second circuit board 251 in the second body 220. Furthermore, the second circuit board 251 may extend so that other components of the mobile terminal, e.g., an antenna, a microphone, etc. can be connected thereto.

Figure 5A:
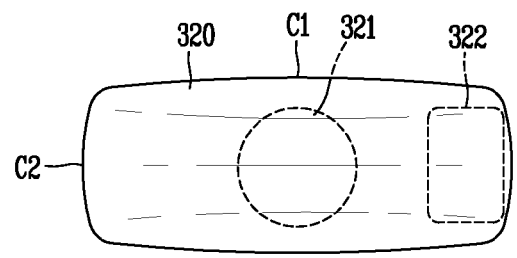
FIGS. 5a-5c are a conceptual view of a key assembly according to an embodiment of the present invention, which illustrates a substrate and a conductive dome.
Figure 5B:
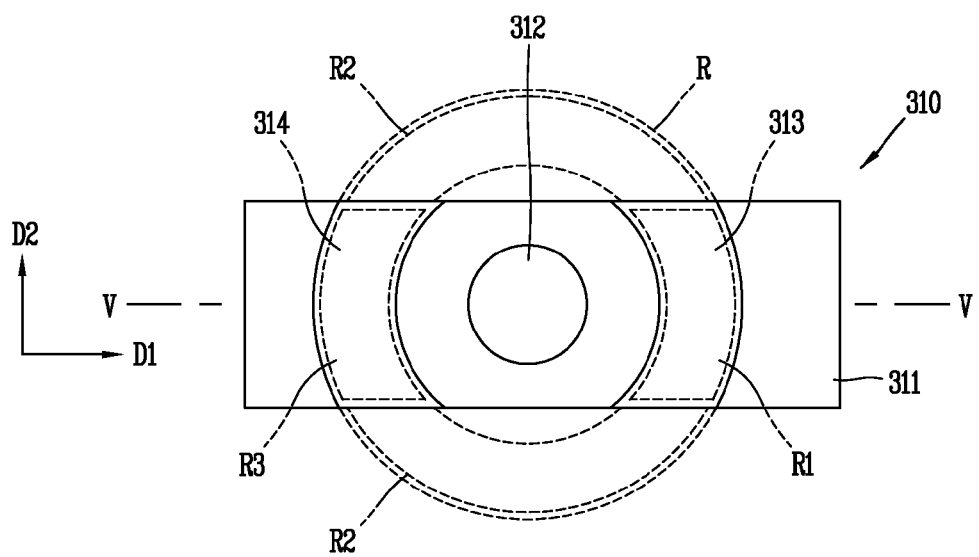
Figure 5C:
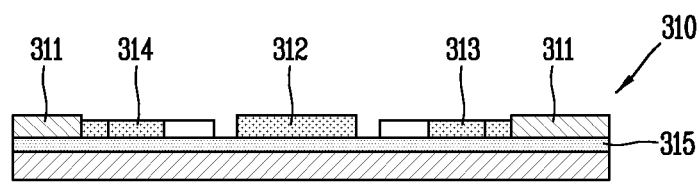
Figure 6A:
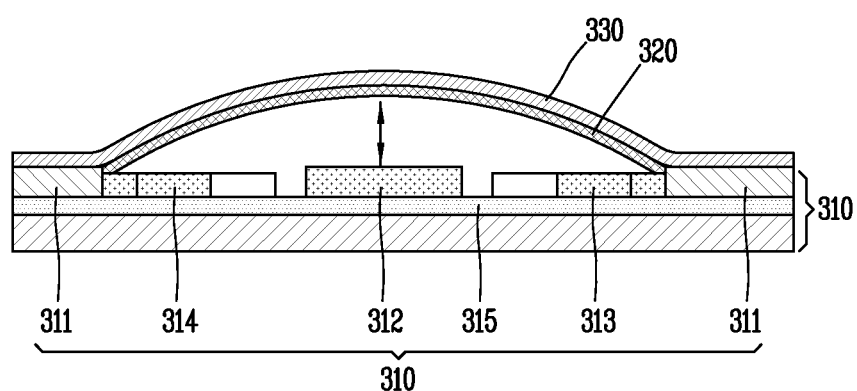
FIGS. 6A and 6B are sectional views showing a coupled state between the substrate and the conductive dome of FIGS. 5a-5c.
Figure 6B:
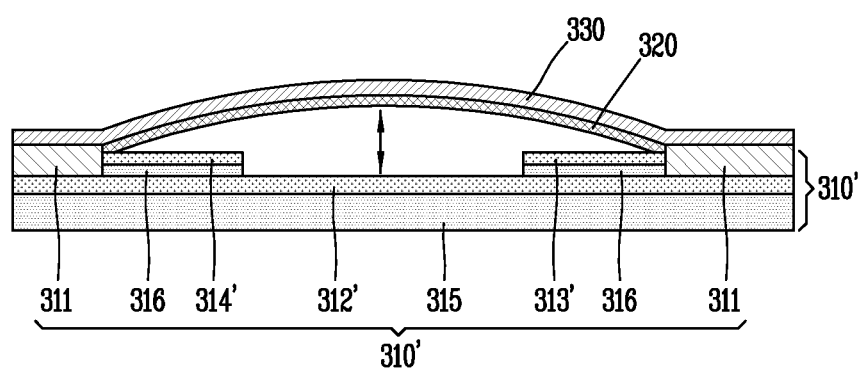

FIG. 5A-5C are a conceptual view of a key assembly according to an embodiment of the present invention, which illustrates a substrate and a conductive dome. FIGS. 6A and 6B are sectional views showing a coupled state between the substrate and the conductive dome of FIG. 5A-5C.

FIG. 5A is a planar view of a conductive dome, FIG. 5B is a planar view of a substrate, and FIG. 5C is a sectional view taken along line 'V-V' in FIG. 5B.

The key assembly constitutes the aforementioned manipulating portion 300, which will be explained in more details.

Substrates 310 and 310' may be implemented as flexible printed circuit boards so as to reduce the entire thickness of the mobile terminal. Alternatively, the substrates 310 and 310' may be implemented as rigid printed circuit boards. The substrates 310 and 310' may include one or more insulating layers 311, 315 and 316, or conductive layers.

The insulating layers 311, 315 and 316 may serve not only as an insulating material, but also as a base substrate where conductive patterns can be formed. The insulating layers 311, 315 and 316 may be formed of plastic such as flexible polyamide.

The conductive layer may be formed of copper having excellent flexibility, by which contact points may be connected to each other.

Contact patterns are formed on one surface of each of the substrates 310 and 310'. The contact patterns may be a first contact point 312 and a second contact point 313 spaced from each other.

As shown in FIG. 5, the first contact point 312 contacts a central part of a conductive dome 320 when the central part of the conductive dome 320 is elastically-transformed by being pressed. Generally, the first contact point 312 is formed in a circular shape.

A second contact point 313 is spaced from one side surface of the first contact point 312 on the substrate 310. The second contact point 313 contacts the edge of the conductive dome 320. The second contact point 313 may not be disposed on another side surface of the first contact point 312. For instance, the second contact point 313 may be formed on the right side of the first contact point 312 on the board 310, but may not be formed on the left, upper, and lower sides of the first contact point 312.

If the first contact points 312 and 312' and the second contact points 313 and 313' on the substrates 310 and 310' are spaced from each other in a first direction (D1), the second contact points 313 and 313' may not be disposed in a second direction (D2) crossing the first direction (D1).

In a case where a ring portion is spaced from the first contact point 312 so as to enclose the first contact point 312, the ring portion may be divided into a first region (R1) where the second contact point 313 is disposed, and a second region (R2) where the second contact point 313 is not disposed. The second region (R2) may be a region formed outside the substrate 310.

In this embodiment of the present invention, the second contact point 313 is not disposed to enclose the outer circumference of the first contact point 312, but is formed only at a predetermined region (R1 or R3). In this case, the area of the substrates 310 and 310' can be reduced. Since the substrates 310 and 310' are disposed in parallel to one side surface of the terminal body, the area of the substrates 310 and 310' is related to the thickness of the terminal body. Accordingly, if the area of the substrates 310 and 310' is reduced, the terminal body can become slimmer.

In FIG. 5, the second contact point 313 has a partially-cut ring shape. However, the shape of the second contact point 313 is not limited to this. That is, the second contact point 313 may have various shapes.

The second contact point 313 may be configured to always contact the conductive dome 320.

Unlike in the aforementioned embodiment, the second contact point 313 may be formed in plurality, and the plurality of second contact points 313 may be spaced from two side surfaces of the first contact point 312 in a state where the first contact point 312 is disposed therebetween. As the contact points are formed in plurality, a key input can be better received.

The conductive dome 320 is formed of elastic metallic material, such that it is transformed by pressure and then it returns to the original shape when the pressure is removed. A dome sheet 330 may be attached to an upper surface of the conductive dome 320 so as to have a constant position with respect to the contact points. The conductive dome 320 may be coupled to the substrates 310 and 310' by the dome sheet 330.

The conductive dome 320 may include a transformation portion 321 contacting the first contact point 312 by being transformed by pressure, and a contact portion 322 contacting at least one of the second contact points 313. That is, the transformation portion 321 may be a central region of the conductive dome 320, and the contact portion 322 may be an edge region of the conductive dome 320.

The contact portion 322 may be formed on two side surfaces of the transformation portion 321.

The conductive dome 320 may be provided with a first curvature (C1) and a second curvature (C2). The first curvature and the second curvature may be equal to each other, or may be different from each other.

As shown in FIG. 5A, the first curvature may be a curvature of a single curved line among curved lines in a horizontal direction, whereas the second curvature may be a curvature of a single curved line among curved lines in a vertical direction.

An elastic force of the conductive dome 320 may be controlled by controlling the first curvature and the second curvature, respectively. More specifically, if the first curvature is less than the second curvature, pressing the conductive dome 320 in a center direction of the first curvature may be easier than pressing the conductive dome 320 in a center direction of the second curvature. Therefore, a transformation rate of the conductive dome 320 according to each position may be controlled. As a result, a key input may be performed more easily.

The dome sheet 330 for coupling the conductive dome 320 to the substrates 310 and 310' may be implemented as an insulating sheet having an insulating property.

FIGS. 6A and 6B are sectional views showing a coupled state between the substrate and the conductive dome of FIG. 5. A key assembly of FIG. 6A according to an embodiment is different from a key assembly of FIG. 6B according to another embodiment.

In the key assembly of FIG. 6A, an insulating layer 315 serves as a base substrate, and a first contact point 312 and a second contact point 313 are formed on the insulating layer 315. Another insulating layer 311 may be formed outside the second contact point 313. Said another insulating layer 311 may be formed to define the second contact point 313, and to support the side surface of the conductive dome 320 coupled thereto.

Part of the dome sheet 330 configured to cover the conductive dome 320 may be coupled to said another insulating layer 311.

In the key assembly of FIG. 6B, a first insulating layer 315 serves as a base substrate, and a first contact point 312 and a second contact point 313 are formed on the first insulating layer 315. However, the first contact point 312 extends to have a predetermined area with covering the base substrate, and a second insulating layer 316 is disposed between the first contact point 312 and the second contact point 313. A third insulating layer 311 may be formed outside the second contact point 313. The third insulating layer 311 may be formed to define the second contact point 313, and to support the side surface of the conductive dome 320 coupled thereto.

Part of the dome sheet 330 configured to cover the conductive dome 320 may be coupled to the third insulating layer 311.

The aforementioned embodiments merely correspond to examples to form contact points on the substrates 310 and 310'. The substrates 310 and 310' may include insulating layers and conductive layers, and may be formed in more various manners.

Figure 7:
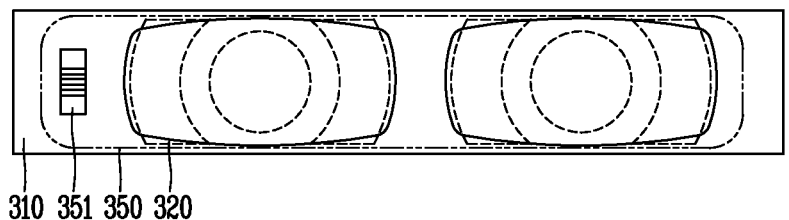
FIG. 7 is a conceptual view of a substrate having a plurality of conductive domes coupled thereto.

FIG. 7 is a conceptual view of a substrate having a plurality of conductive domes 320 coupled thereto.

The conductive dome 320 may be formed in plurality, and first contact points 312 and second contact points 313 may be formed in correspondence to the conductive domes 320. A dome sheet 330 may be formed to cover the conductive domes 320, and a light guiding sheet 350 may be formed to cover the dome sheet 330.

A light emitting device 351 may be mounted to the substrate 310 near one end of the light guiding sheet 350. This may allow the manipulating portion 300 to emit light by pressure. A key body 340 of the manipulating portion 300 may be formed of semi-transparent or transparent material.

Figure 8:
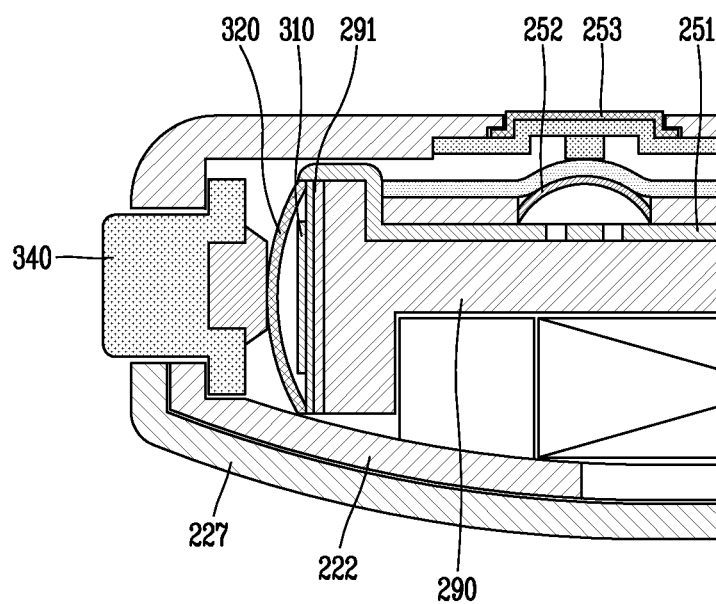
FIG. 8 is a sectional view taken along line 'IV-IV' in FIG. 2.

FIG. 8 is a sectional view taken along line 'Iv-IV' in FIG. 2.

The second body 220 may include the second front case 221 and the second rear case 222, and a battery case 227 may be mounted to the mobile terminal so as to cover the second rear case 222.

A frame 290 is formed to support the inside of the terminal body. In case of a slide type mobile terminal, a key pad substrate 251 is attached to an upper surface of the frame 290, and a circuit board may be attached to a lower surface of the frame 290. Such frame may serve as a housing which forms the appearance of a display module, in case of a bar type, a swivel type, a folder type or a flip type mobile terminal.

The frame 290 is provided with a supporting portion 291 extending from the side surface of the mobile terminal in parallel to the side surface, and the substrate 310 is coupled to the supporting portion 291. And, the conductive dome 320 is coupled to the substrate 310. Under this configuration, the frame 290 may support the manipulating portion when being pressed.

A battery case 227 may be formed to be rounded towards the end of the terminal body. Accordingly, the thickness of the battery case 227 gradually decreases towards the end of the terminal body.

Due to the reduced thickness, the size of the key assembly of the manipulating portion should be minimized. In the present invention, since the second contact point 313 is formed on only one side surface of the first contact 312, the substrate 310 can have a small area.

Accordingly, the terminal body can have a unique appearance with a rounded shape, and can be slim.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body; and
   a manipulating portion disposed on one side surface of the terminal body, the manipulating portion including:
   a substrate disposed in parallel to the one side surface of the terminal body and extending in a first direction and a second direction perpendicular to the first direction, wherein a thickness of the mobile terminal is formed along the second direction;
   a first contact point located on the substrate;
   a second contact point located on the substrate and spaced from the first contact point in the first direction, and, from a center point of the first contact, the second contact portion being arranged so as to not cross the second direction;
   a conductive dome coupled to the substrate, and configured to contact the first and second contact points when being pressed; and
   an insulating layer located on the substrate to support a side surface of the conductive dome, wherein the first contact point, the second contact point and the insulating layer are sequentially located in the first direction on the substrate.

2. The mobile terminal of claim 1, wherein the manipulating portion is mounted to one or more through holes formed on the one side surface of the terminal body, and
   wherein the terminal body further includes a key body configured to press the conductive dome.

3. The mobile terminal of claim 2, wherein the conductive dome is coupled to the substrate by a dome sheet.

4. The mobile terminal of claim 3, wherein the substrate further includes at least one light emitting device, and
   wherein the key body is formed of transparent or semi-transparent material such that light emitted from the light emitting device passes therethrough.

5. The mobile terminal of claim 4, wherein each of the first contact point, the second contact point, the conductive dome, and the key body is formed in plurality, and the plurality of conductive domes are covered with a single dome sheet.

6. The mobile terminal of claim 5, further comprising a light guiding sheet configured to cover the dome sheet.

7. The mobile terminal of claim 1, wherein the thickness gradually decreases towards a region where the manipulating portion is disposed.

8. The mobile terminal of claim 1, further comprising:
   a first body having a display portion; and
   a second body having the manipulating portion, the second body being movably connected to the first body to allow a relative motion with respect to the first body.

9. The mobile terminal of claim 1, wherein the second contact point is formed in plurality, and the plurality of second contact points are arranged such that the first contact point is disposed therebetween.

10. The mobile terminal of claim 1, wherein the substrate is implemented as a flexible printed circuit board.

11. The mobile terminal of claim 1, wherein the conductive dome includes:
   a transformation portion configured to contact the first contact point when transformed by pressure; and
   a contact portion contacting the second contact point, the contact portion being formed in plurality, and the plurality of contact portions being arranged such that the transformation portion is disposed therebetween.

12. The mobile terminal of claim 1, further comprising a ring portion being divided into a first region where the second contact point is disposed and a second region where the second contact point is not disposed.

13. The mobile terminal of claim 12, wherein the ring portion is larger than the substrate such that the second region extends beyond the substrate.

14. The mobile terminal of claim 12, wherein the conductive dome is formed to have a first curvature and a second curvature, the first curvature being formed close to one side end of the substrate and at least part thereof is disposed at the second region and the second curvature being formed to contact the second contact point.

* * * * *